Patented Oct. 9, 1951

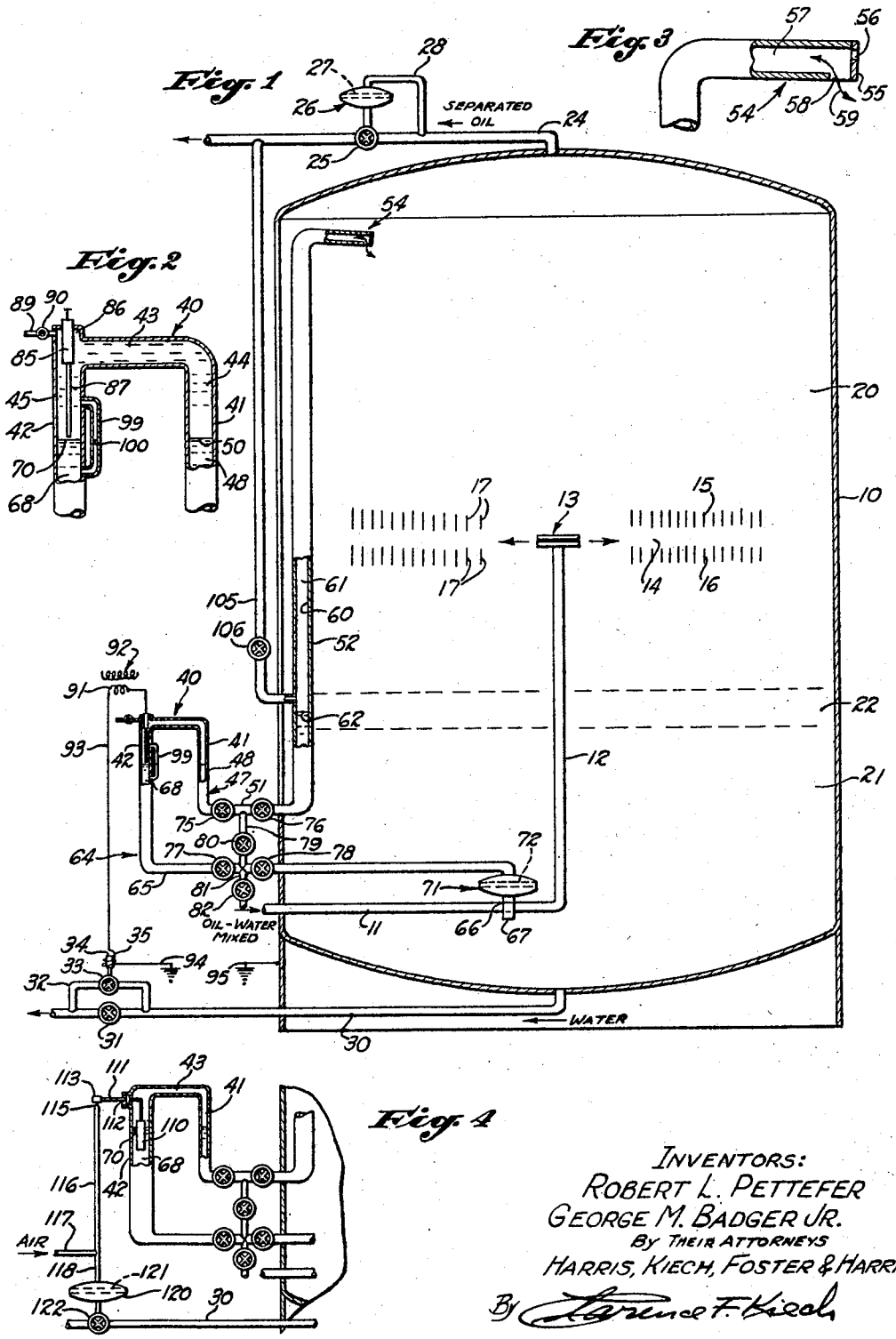

2,570,977

UNITED STATES PATENT OFFICE 2,570,977

LEVEL CONTROL SYSTEM

Robert L. Pettefer and George M. Badger, Jr., Long Beach, Calif., assignors to Petrolite Corporation, Ltd., Wilmington, Del., a corporation of Delaware Application March 5, 1948, Serial No. 13,286

15 Claims. (Cl. 210—51)

Our invention relates to level control systems and more particularly to a novel method and apparatus for maintaining substantially constant the relative amounts of two dissimilar fluids present as upper and lower bodies in a tank. The invention will be particularly exemplified with regard to the control of the relative amounts of oil and water in a tank but it should be clear that the invention is not limited thereto and can be used to control the relative amounts of other fluids.

It is common practice to resolve and/or separate oil-water emulsions in a relatively large tank, typically by establishing a high voltage electric field in the tank to coalesce the water droplets of an emulsion into masses of sufficient size to gravitate from the oil. In other instances, mixtures of oil and water, whether or not preliminarily treated, may be delivered to a tank for separation. In either instance, the tank contains oil and water undergoing separation into superimposed bodies of oil and water.

It is often desirable to control rather accurately the relative amounts of oil and water in such a tank to maintain the interfacial zone at a substantially constant level, typically a fixed distance below an electrode system. However, there may be a layer of sludge between the bodies of oil and water, this sludge being a mixture of the oil and water undergoing separation, so that there is no clean interface in the settling zone of the tank which can be used for control purposes. The present invention contemplates employment of a control column in pressure-transferring relationship at its upper and lower ends respectively with the bodies of oil and water or other bodies of dissimilar fluids in the tank. In such a control column the oil and water or the dissimilar fluids can separate at a relatively clean interface.

However, with certain oils there is still a tendency for some water to separate therefrom in the control column to obscure the interface therein so that movement of this interface cannot always be used to control and maintain substantially constant the relative amounts of oil and water, for example, in the tank. In addition, the oil delivered to the tank admixed with water may change in gravity and a relatively stagnant column of oil in the control column will introduce errors upon such changes in gravity.

It is an object of the present invention to separate substantially all of the water from a portion of the oil before this portion becomes a part of the oil column in such a control column.

Another object of the invention is to bleed continuously from the column a very small stream of oil in a manner tending constantly to renew the oil column and thereby compensate for changes in gravity of the incoming oil.

A further and important object of the invention is to dispose a third or control liquid at some position between columns of oil and water or columns of other fluids to be displaceable upon relative change in pressure in the upper and lower portions of the tank.

Another object of the invention is to dispose such a control liquid in an inverted U-tube providing two depending legs respectively communicating with upper and lower portions of the tank. Still a further object is to provide fluid columns respectively contacting the control liquid in such depending legs and disposed in pressure-transferring relationship with the upper and lower bodies in the tank, these fluid columns forming interfaces with the control liquid in the legs. A further object is to control the relative amounts of oil and water or other dissimilar fluids in the tank in response to changes in position of one of these interfaces.

A further object is to employ aqueous media as these fluid columns and to employ an immiscible liquid as the control liquid.

Another object of the invention is to provide a displaceable control liquid contacting a column of aqueous medium at an interface, the aqueous medium being separated from the water or other fluid body in the tank by a pressure-transmitting member such as a diaphragm.

Further objects and advantages of the invention will be evident to those skilled in the art from the following description of exemplary embodiments.

Referring to the drawing:

Fig. 1 is a vertical sectional view of an electrical treater embodying one form of the invention employing an inverted U-tube and a control column;

Fig. 2 is an enlarged view, partially in section, of the inverted U-tube;

Fig. 3 is an enlarged view, partially in section, of the upper end of the control column of Fig. 1; and Fig. 4 illustrates an alternative embodiment employing an inverted U-tube.

Merely by way of example, the embodiments will be specifically described with reference to the problem of controlling the relative amounts of oil and water in a tank to which a mixture or emulsion thereof is supplied. Additionally, the invention will be exemplified as applied to an electric treater for resolving water-in-oil emulsions. It should be understood that it is applicable to other systems involving other dissimilar fluids and also to other oil-water separating systems in which the amount of oil and/or water delivered to the tank may vary from time to time and in which the gravity of the oil may also vary.

Referring particularly to Fig. 1, a tank 10 of the pressure type receives a pressured stream of admixed oil and water, typically a naturally-occurring or synthesized water-in-oil emulsion. The pressured emulsion enters through a pipe 11 and is carried by a riser pipe 12 to a distributor 13 which jets a thin radially-flowing stream outwardly into a treating space 14 formed between upper and lower electrodes 15 and 16. Each of these electrodes is formed of a plurality of concentric ribbon-like rings 17 and is supported by a suitable insulator, not shown. A high potential difference is established between the electrodes 15 and 16 by a suitable energizing system, not shown. Such electrodes, their supports and their energizing means are well known in the art of electric treatment of emulsions and do not per se form a part of the present invention. Suffice it to say that the incoming emulsion is treated in the treating space 14 to coalesce the water droplets into masses of sufficient size to gravitate from the oil, leaving a body of low-cutting oil or oil-continuous material 20 in the upper portion of the tank and a body of water 21 in the lower portion of the tank, this water being an aqueous or water-continuous medium, typically salt water.

The bodies of oil and water ordinarily do not separate at a clean interface in the tank 10. Rather, a layer of sludge forms in an interfacial zone 22 between the bodies 20 and 21 which are respectively oil-continuous and water-continuous bodies. This sludge comprises a mixture of oil and water undergoing separation. The presence of such sludge makes it difficult or impossible to dispose a float or electrode in the tank 10 to control the relative amounts of oil and water therein and to maintain the body of water 21 a substantially constant distance below the electrodes 15, 16 to prevent short-circuiting thereof.

In the system illustrated, the separated oil is drawn continuously from the top of the tank through a throttled withdrawal means shown as including an oil-withdrawal pipe 24 equipped with a throttling valve 25 of the pressure-reducing type. In effect, the valve 25 acts as a back-pressure valve to maintain a superatmospheric pressure in the tank 10. This valve is controlled by a diaphragm unit 26 including a diaphragm 27 connected to the valve and communicating with the pipe 24 upstream of the valve by a small pipe 28, thus serving to maintain substantially constant the pressure in the tank 10.

The separated water is drawn from the body 21 by a throttled withdrawal means shown as including a water-withdrawal pipe 30 equipped with a main throttling valve 31 with a by-pass 32 therearound. The by-pass includes a valve 33 diagrammatically shown as an electrically-operated valve actuated by a solenoid plunger 34 which is raised and lowered by energizing and de-energizing of a solenoid winding 35 to increase and decrease respectively the flow through the pipe 30.

The level-control system of Fig. 1 includes an inverted U-tube 40 providing depending legs 41 and 42 containing a body of control liquid 43 extending into the legs 41 and 42 to form columns 44 and 45 therein.

A control conduit, indicated generally by the numeral 47, communicates with the depending leg 41 and contains a liquid column 48 in contact with the control liquid at an interface 50. The liquid column 48 is in pressural communication with the oil in the upper portion of the tank 10. As shown, the control conduit 47 includes a pipe 51 extending into the tank and communicating with the lower end of a control column 52. This control column 52 is preferably a fairly large pipe traversing the interfacial zone 22. Its upper end is shown as communicating with the body of oil 20 near the top of the tank through an inlet fitting 54 which slopes downwardly and inwardly a matter of a few degrees, typically about 3 degrees or somewhat more. The end of this inlet fitting is preferably closed by a plate 55 providing a small vent hole 56 near the top of a space 57 within the inlet fitting. An opening 58 is provided in the bottom of the inlet fitting adjacent the plate 55 and through which oil may move in either direction, as suggested by the double-headed arrow 59.

The upright portion of the control column 52 forms a passage 60 and this passage, together with the space 57 is normally filled with a column of oil 61 openly communicating through the opening 58 with the oil body 20. The liquid column 48 is usually an aqueous medium and extends from the leg 41 through the pipe 51 and into the lower end of the passage 60, being in contact with the column of oil 61 at an interface 62.

The depending leg 42 of the inverted U-tube 40 is in pressural communication with the body of water 21 in the lower end of the tank 10. This communication is preferably through a fluid conduit indicated generally by the numeral 64 and shown as including a pipe 65 extending into the tank and turning downwardly to provide a depending portion 66 having an open lower end 67 communicating with the body of water 21. The fluid conduit 64 contains a liquid column 68 which contacts the control liquid 43 at an interface 70 in the depending leg 42. The liquid column 68 is usually an aqueous medium and may be in open communication with the body of water 21 through the pipe 65 and its depending portion 66. However, the body of water 21 is sometimes contaminated with solid material and usually contains solutes which are sometimes desirably separated from the aqueous medium of the liquid column 68. In this event a diaphragm unit 71 may be interposed in the depending portion 66 or in some other portion of the pipe 65 to provide a diaphragm 72 separating the two liquid media yet permitting pressure transfer therebetween.

For a purpose to be described, the pipe 51 contains valves 75 and 76 while the pipe 65 contains valves 77 and 78. Connecting the pipes 51 and 65 intermediate these valves is a by-pass pipe 79 containing a valve 80. In addition, a drain pipe 81 communicates with the pipe 65 at a position between the valves 77 and 78 and is equipped with a valve 82. All of these valves are manually controllable. During normal operation the valves 80 and 82 are closed and the valves 75, 76, 77 and 78 are open.

With the arrangement of liquids shown, any change in relative amounts of oil and water in the tank 10 will be reflected in changes in pressure applied to the opening 58 of the inlet fitting 54 and the open end 67 of the depending portion 66. Correspondingly, any such change in relative amounts of oil and water in the tank will cause the interface 62 to move correspondingly in the control column 52. Due to the presence of the liquid columns 48 and 68, any movement of the interface 62 will be transmitted to the control liquid 43 to raise and lower differentially the interfaces 50 and 70. The degree of shifting of the interfaces 50 and 70 from their equilibrium positions shown may be made much greater than the degree of movement of the interface 62 if the depending legs 41 and 42 are of smaller cross-sectional area than the control column 52. This arrangement is often desirable as magnifying the movement of the interfaces 50 and 70 relative to the interface 62 and thus giving a more sensitive control.

The invention comprehends means responsive to a change in position of one of the interfaces 50, 70 for changing the relative amounts of liquids in the tank 10. In the system shown in Figs. 1 and 2 a bushing 85 extends into a pocket 86 at the top of the depending leg 42 and carries an electrode 87 extending downwardly in the column 45 of control liquid to provide a lower end contactable by the liquid column 68 upon rise in the interface 70. A small pipe 89 containing a valve 90 communicates with the pocket 86 for a purpose to be described. The electrode 87 is connected to actuate the valve 33 when the liquid column 68 engages this electrode or rises therealong. This may be accomplished by connecting the electrode 87 to a source of potential, shown as the secondary winding 91 of a step-down transformer 92. This secondary winding is connected by a conductor 93 to one terminal of the solenoid winding 35, the other terminal of this solenoid being grounded at 94. The tank 10 and its connected piping is grounded as indicated at 95. The control liquid 43 is, in this embodiment, an oil of relatively high dielectric strength, typically a transformer oil or a relatively viscous refined oil, the latter being desirable if quick pressure fluctuations are to be damped out. Ordinary transformer oil will, however, be found entirely satisfactory in most instances and will produce clean interfaces 50 and 70.

If the amount of water in the tank 10 increases relative to the amount of oil therein, the interface 62 will rise. This will lower the interface 50 and raise the interface 70 into contact with the electrode 87. A circuit will then be completed from ground through the liquid column 68, the electrode 87, the secondary winding 91 and the conductor 93 to energize the solenoid winding 35. This will lift the plunger 34. The valve 33 will be of such type as to move to a more open position upon such lifting of the plunger 34, thus setting up or increasing the water flow through the by-pass 32. Normally, the valve 31 is set to discharge a slight deficiency of water so that actuation of the valve 33 makes up this deficiency and its adjustment keeps the relative amounts of oil and water in the tank 10 substantially constant.

It will be apparent that the showings in Figs. 1 and 2 are diagrammatic, both structurally and electrically, and that various arrangements of pipes can be employed to construct the inverted U-tube. It should be apparent also that the manner of electrically connecting the electrode 87 and the valve 33 is also shown only diagrammatically and that any one of a number of arrangements, known in the art, can be employed to actuate the valve 33 or the valve 31 in response to change in position of either of the interfaces 50 or 70.

The system can be filled with the various liquids in any one of a number of ways. For example, the columns of aqueous media 48 and 68 may be inserted into the system in any suitable way and the valves 75 and 77 closed after which the oil or other control liquid can be introduced through the small pipe 89. Usually, however, a body of water may be initially introduced into the tank 10 with the valves 75, 76, 77 and 78 open and with valves 80 and 82 closed. If the diaphragm unit 71 is not in place, this will permit the water to fill the inverted U-tube and rise to the position of the interface 62. If the diaphragm unit 71 is in place, water or other aqueous medium may be introduced through the pipe 81 by opening the valve 82 to fill the pipe system between the diaphragm 72 and the desired position of the interface 62. The valves 76 and 78 can then be closed. By opening the valves 75, 80 and 82, the desired amount of the aqueous medium can be drained from the depending leg 41, the valve 90 being open at this time. Likewise, by opening the valves 77 and 82 a portion of the aqueous medium can be drained from the depending leg 42. The upper portion of the inverted U-tube can then be filled with the control liquid through the pipe 89, after which the valve 90 is closed. The remainder of the tank 10 can then or earlier be filled with oil, this oil entering the passage 60 to establish the column of oil 61.

Alternatively, if the diaphragm unit 71 is not in place, superimposed bodies of oil and water can be placed in the tank and the lower portion of the control system will fill with water, the upper portion filling with oil, the interface 62 being at the desired position. The control liquid may then be introduced into the inverted U-tube as previously described after which the system will be operated with the valves 75, 76, 77 and 78 open and the valves 80, 82 and 90 closed.

To aid in determining the position of the interface 50 or 70, the legs of the inverted U-tube may be formed of glass or other transparent material. Alternatively, a sight glass 99 may communicate with the depending leg 42 so that a visually-observable interface 100 is present therein. A similar sight glass may be applied to the depending leg 41, if desired.

In certain instances it may be found that a small amount of water will gradually settle from the column of oil 61 to appear as sludge adjacent the interface 62, particularly if the inlet fitting 54 is not employed and the upper end of the control column 52 is open to the oil in the top of the tank 10. This is because the separated oil may still contain a very small amount of water dispersed therein and a small portion of this oil will enter the passage 60 by a "breathing" action during continued operation, the water therein settling toward the interface 62 and often forming a layer of sludge immediately thereabove. To avoid this, the inlet fitting 54 is preferably used. The space 57 thereof provides a settling zone for the oil and any water separating therefrom will drain downwardly into the tank through the opening 58 rather than being drained into the passage 60. The small vent hole 56 prevents any entrapment of air or gas in the space 57 and is usually of sufficiently small size that no oil enters the space 57 therethrough.

If the gravity or density of the oil phase of the incoming emulsion changes from time to time, the control system will tend to maintain the interface 62 in constant position but the interfacial zone 22 may vary in position relative to the electrodes. For example, a change in incoming oil gravity from 15.2° API to 14.5° API may change the position of the interfacial zone a foot or more depending upon the height of the tank 10. To compensate for such changes in gravity, if severe, the present invention contemplates the continuous withdrawal of a small stream of oil from the passage 60, preferably from a zone just above the interface 62. This means may comprise a small pipe means 105, usually with a restriction therein formed by a suitable restricted orifice or a needle valve 106. The lower end of this pipe means opens on the interior of the control column 52 just above the desired position of the interface 62. Its upper end communicates with the oil withdrawal pipe 24 at a position beyond the valve 25. Due to this valve, the pressure in the pipe 24 downstream of the valve will be lower than the pressure in the tank 10 wherefore a very small stream of oil will be constantly withdrawn from the passage 60 to renew the column of oil 61. The effective cross-sectional area of the pipe means 105 should be much smaller than the cross-sectional area of the passage 60 to limit to a low value the rate of flow through the pipe means and to limit to an even lower value the rate of flow of oil along the passage 60. In this way, the low-velocity flow of oil along the passage 60 will not set up a pressure drop tending detrimentally to influence the level-control system and the pressure conditions in the passage 60 will be substantially the same as if the column of oil were strictly static.

It should be stressed that the invention is not limited to the control of the relative amounts of oil and water by controlling the effluent water. Control of the relative amounts may be by control of the incoming materials, control of the flow of separated oil or control of the flow of separated water. For example, the pipes 24 and 30 each constitute a flow conduit providing a fluid passageway and either of these pipes can be equipped with an adjustable valve means operating to change the relative amounts of the two liquids in the tank. In addition, it should again be mentioned that the invention is not limited to the control of the relative amounts of oil and water in a tank but can be used to control the relative amounts of any two dissimilar fluids present as separate bodies therein, e. g., superimposed bodies of gas and liquid. If the body 20 is a gas and the body 21 is a liquid, the system can be made to control accurately the level of this liquid in the tank 10.

Nor is the invention limited to electric means responsive to the position of the interfaces 50 or 70. Thus, in Fig. 4, the electrode 87 is replaced by a float 110 disposed in the depending leg 42 to be submerged partially in the control liquid 43 and partially in the aqueous medium of the liquid column 68, the float being of an effective density intermediate the density of the two liquids. The upper end of the float is pivoted to a lever 111 which extends through a diaphragm or packless gland 112. At the outer end of the lever 111 is a valve member 113 which moves toward and away from a tip 115 of a small air pipe 116 fed from an air line 117. Another pipe 118 extends from the junction of the pipes 116 and 117 to a diaphragm unit 120 to control the pressure above a diaphragm 121. This diaphragm is connected in operative relationship with a valve 122 controlling the water effluent from the tank.

With this arrangement there is a restricted escape of air from the tip 115. As the interface 70 rises, the float 110 moves the valve member 113 toward the tip 115 thus further restricting or cutting off the discharge of air and thereby increasing the pressure in the pipes 116 and 118 to depress downwardly the diaphragm 121. The valve 122 is so constructed that such downward movement of the diaphragm incrementally opens the valve 122 to a greater degree thus increasing the amount of water moving through the pipe 30 from the tank 10 and thus tending to lower the interfaces 62 and 70. When the interface 70 is again at the desired position, the float 110 lowers slightly to decrease the restriction at the tip 115 and thus decrease the pressure on the diaphragm 121.

Various changes and modifications can be made without departing from the spirit of the invention as defined in the appended claims.

We claim as our invention:

1. An apparatus for maintaining substantially constant the relative amounts of two dissimilar fluids of different density in a tank, the upper and lower portions of said tank respectively containing fluid bodies comprising the lighter and heavier of said fluids, the heavier of said fluids being a liquid, at least one of said fluids being delivered to said tank through a fluid passageway and at least one of said fluids being withdrawn from its respective portion of said tank through a fluid passageway, said apparatus including in combination: an inverted U-tube comprising two depending legs; a displaceable body of control liquid in said inverted U-tube and partially filling said depending legs; conduit means respectively communicating with said legs and containing liquid columns substantially immiscible with and contacting said control liquid in the respective depending legs to form interfaces therewith; means for transmitting pressure from the upper portion of said tank to one of said liquid columns; means for transmitting pressure from the lower portion of said tank to the other of said liquid columns whereby said control liquid is displaceable in the inverted U-tube upon change in relative pressures in the upper and lower portions of said tank; a level-responsive means responsive to a change in position of one of said interfaces; control means for changing the relative amounts of said fluids in said tank; and means for operatively connecting said level-responsive means and said control means.

2. An apparatus as defined in claim 1 in which said control means comprises an adjustable valve means in one of said fluid passageways to control fluid passage therethrough to change the relative amounts of said two fluids in said tank, and in which said connecting means operatively connects said level-responsive means and said adjustable valve means.

3. An apparatus for maintaining substantially constant the relative amounts of two dissimilar fluids of different density in a tank, the upper and lower portions of said tank respectively containing fluid bodies comprising the lighter and heavier of said fluids, the heavier of said fluids being a liquid, at least one of said fluids being delivered to said tank through a fluid passageway at a varying rate and at least one of said fluids being withdrawn from its respective portion of said tank through a fluid passageway, said apparatus including in combination: an inverted U-tube containing a displaceable body of oil and comprising two depending legs partially filled with columns of said oil; a first conduit communicating with one of said depending legs and pressurally communicating with said fluid in said lower portion of said tank, said first conduit containing a body of aqueous medium of higher density than said oil and contacting same at an interface in said one leg; a control conduit communicating with the other of said depending legs and pressurally communicating with said fluid in said upper portion of said tank, said control conduit containing a body of aqueous medium of higher density than said oil and contacting same at an interface in said other leg, said interfaces moving differentially upon change in relative pressures in said upper and lower portions of said tank; a level-responsive means responsive to a change in position of one of said interfaces; control means operatively associated with one of said passageways for changing the relative amounts of said fluids in said tank; and means for operatively connecting said level-responsive means and said control means.

4. An apparatus as defined in claim 3 in which said level-responsive means includes an electrode in the column of oil in one of said legs and contactable by the aqueous medium therein, and in which said control means and said connecting means include a valve means in said one of said passageways to control fluid passage therethrough to change the relative amounts of said two fluids in said tank, electric means for controlling the operation of said valve means, and circuit means electrically connecting said electrode and said electric means for controlling the operation of the latter upon rise and fall of the interface adjacent said electrode.

5. An apparatus as defined in claim 3 in which said fluid body in said lower portion of said tank is a body of an aqueous medium, and including a relatively large diaphragm connected to said first conduit for transmitting pressure from said body of aqueous medium in said tank to said body of aqueous medium in said first conduit to transmit pressure therebetween while maintaining these aqueous media separated.

6. An apparatus as defined in claim 3 including two spaced valves in said control conduit with an intermediate section therebetween, two spaced valves in said first conduit with an intermediate section therebetween, a by-pass pipe extending between said intermediate sections of said first conduit and said control conduit, and a by-pass valve in said by-pass pipe, said by-pass valve being normally closed and said spaced valves being normally open to effect displacement of said body of oil in said inverted U-tube in response to the relative amounts of said fluids in said tank.

7. An apparatus as defined in claim 3 in which said control conduit provides a lower section containing its said body of aqueous medium and an upper section openly communicating with said fluid in said upper portion of said tank, said upper section containing a column of this fluid in contact with said body of aqueous medium in said lower section of said control conduit, the fluid in this column being substantially immiscible with said body of aqueous medium in said lower section of said control conduit.

8. An apparatus as defined in claim 7 including means for continuously bleeding from said upper section of said control conduit a small stream of said fluid of said column therein, said means including a small pipe means for withdrawing a small stream of such fluid to draw into said upper section a low-velocity stream of this fluid from the upper portion of said tank and thus acting continuously to flush said upper section.

9. An apparatus for maintaining substantially constant the relative amounts of two dissimilar fluids of different density in a tank, the upper and lower portions of said tank respectively containing fluid bodies comprising the lighter and heavier of said fluids, the heavier of said fluids being an aqueous medium, at least one of said fluids being delivered to said tank at a varying rate, at least said aqueous medium being withdrawn from said tank through a flow conduit, said apparatus including in combination: a conduit containing a displaceable body of a control liquid and two columns of aqueous media respectively contacting separate surfaces of said control liquid to form separate interfaces therewith, said control liquid being substantially immiscible with the aqueous media of said two columns; first means for transmitting to one column of aqueous medium the pressure in said upper portion of said tank; second means for transmitting to the other column of aqueous medium the pressure of said aqueous medium in the lower portion of said tank; an adjustable valve means in said flow conduit; a level-responsive means responsive to a change in position of one of said interfaces; and means for operatively connecting said level-responsive means and said adjustable valve means.

10. An apparatus as defined in claim 9 in which said second means includes a pressure-transmitting member separating said other column of aqueous medium from said aqueous medium of aqueous medium in said tank to place these aqueous media in pressure-transmitting relationship while definitely separating same to prevent intercontamination.

11. In the art of controlling the relative amounts of oil and water separating in a tank from a mixture of oil and water delivered to said tank and forming in said tank an upper oil-continuous body still containing a small amount of gravitationally separable water and a lower water-continuous body, the tank being equipped with means for controlling the withdrawal of liquid from one of said bodies to maintain substantially constant the relative amounts of oil and water in said tank, the oil in said mixture varying in gravity from time to time, an apparatus for compensating for such changes in gravity of said oil, said apparatus including in combination: oil-withdrawal means for withdrawing separated oil-continuous material from said body thereof; water-withdrawal means for withdrawing separated water-continuous material from said body thereof; a throttling means in each of said withdrawal means for throttling the flows therethrough whereby the pressure ahead of said throttling means and in said tank is higher than the pressure downstream of said throttling means; a control column providing a passage having an upper end open to said oil-continuous body in said tank and a lower end communicating pressurally with said water-continuous body in said tank, said passage containing a body of said oil-continuous material in contact with a body of an aqueous material to provide an interface in an interfacial zone of said passage, said interface rising and falling in said interfacial zone in response to the relative amounts of oil and water in said tank, the body of oil-continuous material in said passage containing a small quantity of water which tends to separate therefrom to form a sludge obscuring said interface; and means for continuously bleeding from said passage a small stream of said oil-continuous material to renew slowly said body of oil-continuous material therein and to compensate for said variations in gravity, said last-named means comprising a small pipe means opening on said passage at a position just above said interfacial zone and communicating with said oil-withdrawal means at a position downstream from its throttling means, said pipe means comprising a restricted passageway much smaller in effective cross-sectional area than said passage of said control column to limit to a very small value the rate of flow of oil-continuous material through said pipe means and to an even lower value the rate of flow of oil-continuous material along said passage.

12. In the art of controlling the relative amounts of oil and water separating in a tank from a mixture of oil and water delivered to said tank and forming in said tank an upper oil-continuous body still containing a small amount of gravitationally separable water and a lower water-continuous body, there being means for respectively withdrawing liquids from said bodies and means responsive to changes in position of an interface for controlling such withdrawal of at least one of said liquids, an apparatus for establishing such interface, said apparatus including in combination: a control column providing a passage having an upper end and a lower end respectively containing a column of oil-continous material and a column of aqueous medium contacting at an interface; means for transmitting pressure between said lower water-continuous body and said column of aqueous medium; and an inlet fitting at the top of said control column and defining a settling space communicating openly between said upper end of said passage and said oil-continuous body in said tank, any oil-continuous material entering said top of said control column from said oil-continuous body passing through said settling space to give an opportunity for any water in the oil-continuous material to settle therefrom in said settling space, said inlet fitting including means for draining such separated water from said settling space.

13. An apparatus as defined in claim 12 in which said inlet fitting comprises a pipe defining said settling space and sloping downwardly away from the top of said control column to provide a lower portion including said draining means, said draining means discharging any separated water into said oil-continuous body.

14. An apparatus as defined in claim 12 in which said inlet fitting provides a sloping wall at the bottom of said settling space and terminating at a downwardly-facing opening of said inlet fitting, said opening communicating openly between said settling space and said oil-continuous body in said tank, said wall sloping downwardly away from the top of said control column, any water settling from the oil-continuous material in said settling space draining along said sloping wall through said downwardly-facing opening and into said oil-continuous body in said tank.

15. In a level-control system of the type including a level-responsive means responsive to changes in position of an interface and operatively connected to a control means for changing the relative amounts of two dissimilar fluids of different density present as superimposed bodies in a space, an apparatus for establishing a clean interface for such level-responsive means and which clean interface is spaced from and distinct from any interface between said bodies of dissimilar fluids in said space, said apparatus including: an inverted U-tube comprising two depending legs and containing a body of control liquids; a first conduit providing one end in pressure-transferring relationship with the upper fluid body and another end connected to one of said depending legs, said first conduit containing a column of liquid substantially immiscible with said control liquid and contacting same in said one depending leg to form a first interface therewith; a second conduit providing one end in pressure-transferring relationship with the lower fluid body and another end connected to the other of said depending legs, said second conduit containing a column of liquid substantially immiscible with said control liquid and contacting same in said other depending leg to form a second interface therewith; and means for mounting said level-responsive means in one of said depending legs to be responsive to changes in position of the interface therein.

ROBERT L. PETTEFER.
GEORGE M. BADGER, Jr.

REFERENCES CITED

The following references are of record in the file of this patent:

UNITED STATES PATENTS

| Number | Name | Date |
| --- | --- | --- |
| 1,722,160 | Smith | July 23, 1929 |
| 2,021,655 | Jonas | Nov. 19, 1935 |
| 2,025,883 | Mobley | Dec. 13, 1935 |
| 2,072,206 | Hetzer | Mar. 2, 1937 |
| 2,119,348 | Parsons | May 31, 1938 |
| 2,216,977 | Mahone | Oct. 8, 1940 |
| 2,338,986 | Waterman | Jan. 11, 1944 |
| 2,377,565 | McDonald | June 5, 1945 |